US010166501B2

(12) United States Patent
Imoto et al.

(10) Patent No.: US 10,166,501 B2
(45) Date of Patent: Jan. 1, 2019

(54) GAS GENERATOR

(71) Applicant: DAICEL CORPORATION, Osaka-shi, Osaka (JP)

(72) Inventors: Katsuhiro Imoto, Tatsuno (JP); Masayuki Yamazaki, Osaka (JP)

(73) Assignee: DAICEL CORPORATION, Osaka-Shi, Osaka (JP)

( * ) Notice: Subject to any disclaimer, the term of this patent is extended or adjusted under 35 U.S.C. 154(b) by 25 days.

(21) Appl. No.: 15/539,781

(22) PCT Filed: Jan. 25, 2016

(86) PCT No.: PCT/JP2016/051953
§ 371 (c)(1),
(2) Date: Jun. 26, 2017

(87) PCT Pub. No.: WO2016/129364
PCT Pub. Date: Aug. 18, 2016

(65) Prior Publication Data
US 2018/0264389 A1    Sep. 20, 2018

(30) Foreign Application Priority Data

Feb. 9, 2015   (JP) ................................ 2015-022880
Jan. 21, 2016  (JP) ................................ 2016-009577

(51) Int. Cl.
*B01D 46/24* (2006.01)
*B01J 7/00* (2006.01)
(Continued)

(52) U.S. Cl.
CPC ....... *B01D 46/2403* (2013.01); *B01D 46/001* (2013.01); *B01D 46/0005* (2013.01);
(Continued)

(58) Field of Classification Search
CPC ............ B01D 46/2403; B01D 46/0005; B01D 46/001; B01J 7/00; B60R 21/2644; B60R 2021/2648
(Continued)

(56) References Cited

U.S. PATENT DOCUMENTS 5,753,852 A * 5/1998 Bernau ............... B60R 21/2644
102/530
6,460,883 B1 * 10/2002 Nakashima ............ B01D 46/24
280/736

(Continued)

FOREIGN PATENT DOCUMENTS

EP    1258401 A1   11/2002
JP    10-95304 A    4/1998
(Continued)

*Primary Examiner* — Samir Abdosh
(74) *Attorney, Agent, or Firm* — Birch, Stewart, Kolasch & Birch, LLP

(57) ABSTRACT

The present invention provides a gas generator in which short-passing of combustion gas is prevented.

A cylindrical filter 30 including a first annular end surface 32 abutted against a top plate 12 and a second annular end surface 33 abutted against a bottom plate 21 is disposed inside a housing 10. A corner portion 75 formed by a bottom surface 71 and an outer circumferential wall 74 of a support member 70 is abutted against an abutting portion between the second annular end surface 33 and the bottom plate 21 to prevent the short-passing of the combustion gas from this portion.

3 Claims, 3 Drawing Sheets

(51) Int. Cl.
 *B01D 46/00* (2006.01)
 *B60R 21/264* (2006.01)
(52) U.S. Cl.
 CPC ............. *B01J 7/00* (2013.01); *B60R 21/2644* (2013.01); *B60R 2021/2648* (2013.01)
(58) Field of Classification Search
 USPC ....................................................... 102/530
 See application file for complete search history.

(56) References Cited

U.S. PATENT DOCUMENTS

| | | | | |
|---|---|---|---|---|
| 6,540,256 | B2* | 4/2003 | Iwai | B60R 21/2644 280/736 |
| 6,547,275 | B2* | 4/2003 | Nakashima | B01D 46/24 280/736 |
| 6,695,345 | B2 | 2/2004 | Katsuda et al. | |
| 6,929,284 | B1* | 8/2005 | Saso | B60R 21/2644 280/736 |
| 8,783,188 | B1 | 7/2014 | Mayville et al. | |
| 2001/0013300 | A1* | 8/2001 | Lutz | B60R 21/2644 102/530 |
| 2002/0135172 | A1* | 9/2002 | Koga | B60R 21/2644 280/741 |
| 2004/0061319 | A1* | 4/2004 | Saso | B60R 21/2644 280/741 |
| 2005/0052006 | A1* | 3/2005 | Nishimura | B60R 21/261 280/736 |
| 2006/0016362 | A1 | 1/2006 | Quioc et al. | |
| 2006/0119086 | A1* | 6/2006 | Blessing | B60R 21/2644 280/736 |
| 2008/0129027 | A1* | 6/2008 | Nakayasu | B60R 21/2644 280/741 |
| 2008/0257195 | A1* | 10/2008 | Nakayasu | B60R 21/2644 102/530 |
| 2011/0179967 | A1* | 7/2011 | Yamazaki | B60R 21/2644 102/530 |
| 2014/0096697 | A1* | 4/2014 | Okuyama | B60R 21/2644 102/530 |

FOREIGN PATENT DOCUMENTS

| | | |
|---|---|---|
| JP | 11-334517 A | 12/1999 |
| JP | 2001-206189 A | 7/2001 |
| JP | 2001-233167 A | 8/2001 |
| JP | 2011-207326 A | 10/2011 |
| WO | WO 2011/122510 A1 | 10/2011 |

\* cited by examiner

[Fig. 1]
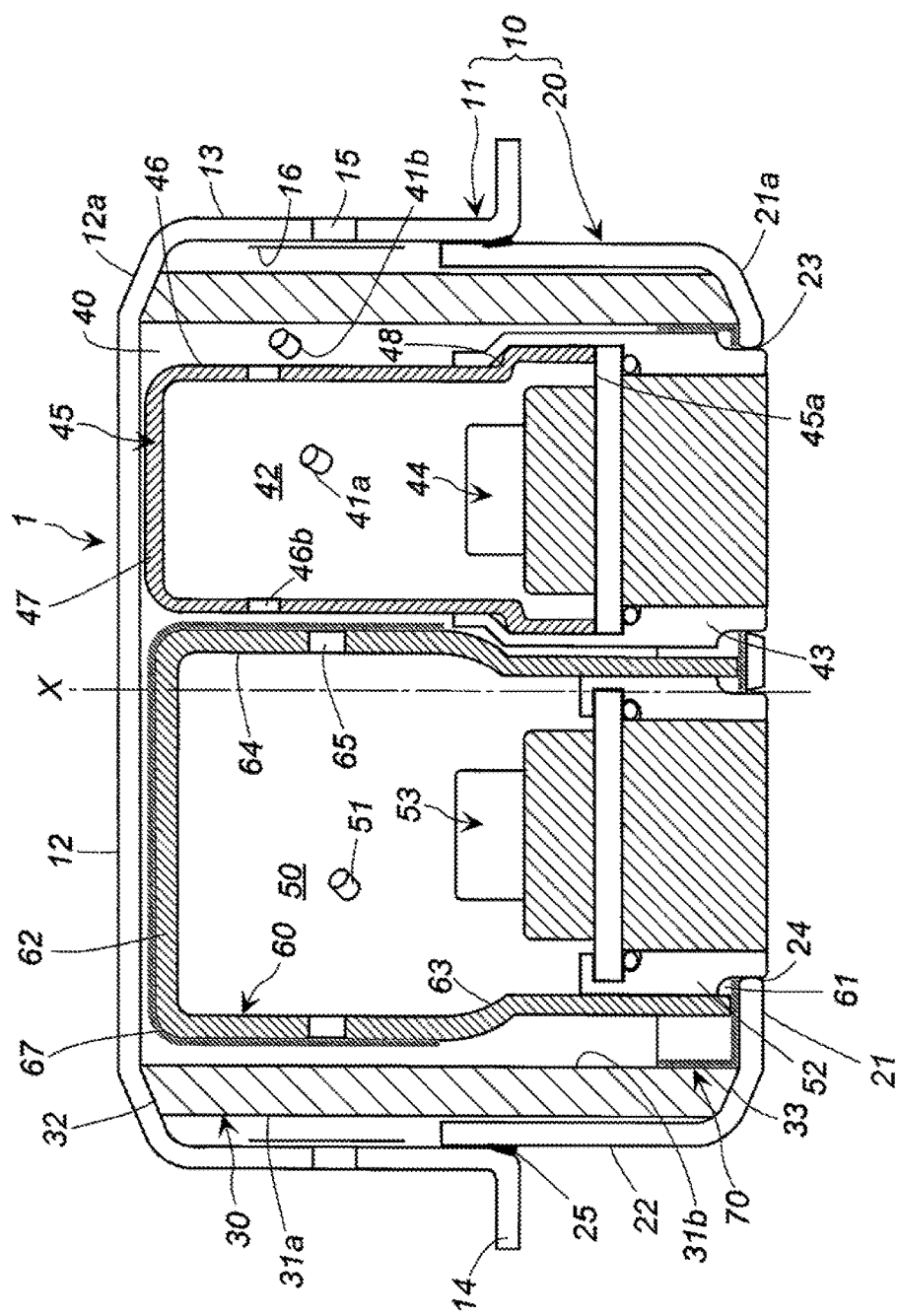

[Fig. 2]
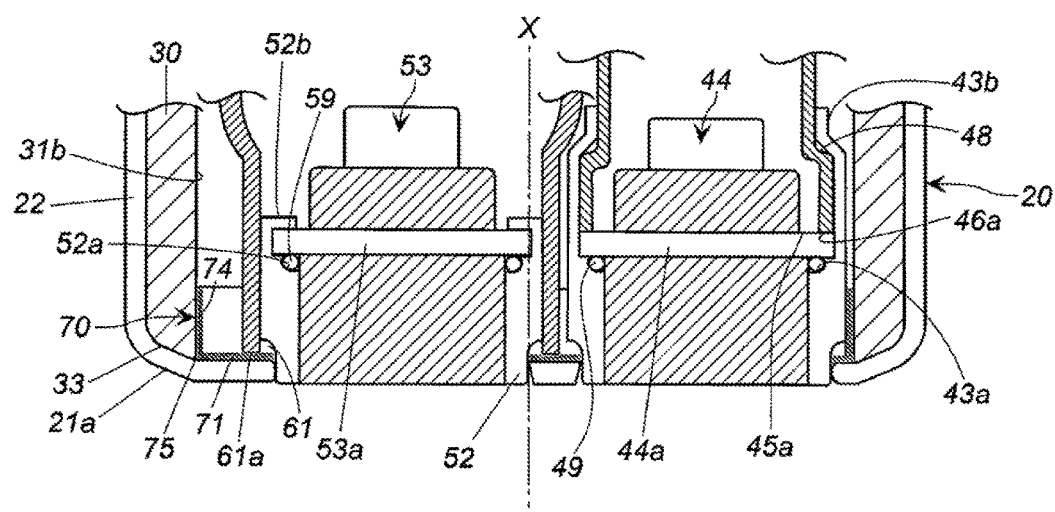
[Fig. 3]
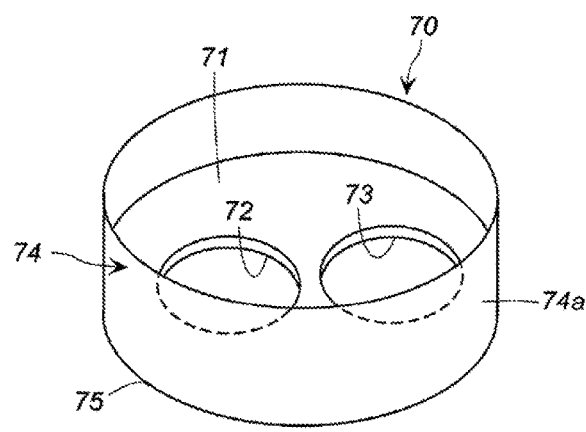

[Fig. 4]
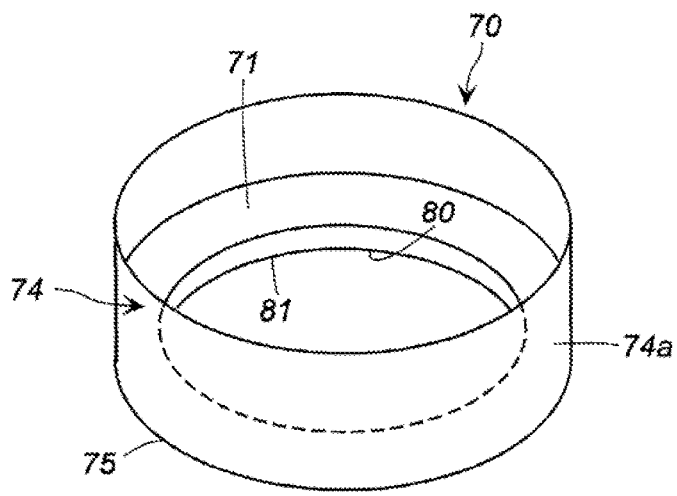

GAS GENERATOR

FIELD OF INVENTION

The present invention relates to a gas generator capable of being used in an airbag apparatus to be installed in an automobile.

DESCRIPTION OF THE RELATED ART

A gas generator in which a gas generating agent is used as a gas generation source is generally used in an airbag apparatus to be installed in an automobile.

When an igniter of the gas generator is activated to burn the gas generating agent, mist including a metal in a molten state may be contained in the combustion gas.

The mist contained in the combustion gas is filtered by a coolant-filter disposed in a housing of the gas generator, and the mist is unlikely to be discharged from the gas generator into the airbag.

At the time of activation of the gas generator, if the housing deforms due to the rise of the internal pressure and a gap is formed between the housing and the coolant-filter, "short-passing" may occur, that is, the combustion gas including the mist may be discharged directly from a gas discharge port into the airbag, without passing through the coolant-filter.

In order to prevent the occurrence of such short-passing, in FIG. 16 of JP-A No. H10-95304, a coolant-filter support member 432 is press-fitted and disposed on the side of a top plate of a housing (in paragraph 0134); in FIG. 2 of JP-A No. 2001-206189, a coolant support member 32 is press-fitted and disposed on the side of a top plate of a housing (in paragraph 0041); and in FIG. 2 of JP-A No. 2001-233167, a coolant device support member 50 is press-fitted and disposed on side of a top plate of a housing (in paragraph 0037).

In FIG. 11 of JP-A No. H11-334517, it is described that an underplate 18 is press-fitted and disposed on the side of a bottom plate of a housing and the underplate is for supporting a gas generating agent 6 (in paragraph 0053).

In FIG. 12 of JP-A No. H11-334517, a coolant support member 55 is disposed on the side of a top plate of a housing to prevent the short-passing (in paragraph 0050), and a partition member 110 is disposed on the side of the bottom plate of the housing.

SUMMARY OF THE INVENTION

The present invention provides a gas generator including a housing famed by a diffuser shell provided with a gas discharge port, and a closure shell, a cylindrical filter disposed inside the housing, a first combustion chamber and a second combustion chamber arranged inside the cylindrical filter, the cylindrical filter being disposed such that an outer circumferential surface is spaced apart from the gas discharge port, a first annular end surface is abutted against a top plate of the diffuser shell, and a second annular end surface is abutted against a bottom plate of the closure shell, the first combustion chamber being a space on the outer side of an ignition device chamber provided with an ignition device for a first-b gas generating agent filled inside the first combustion chamber, and the second combustion chamber being filled with a second gas generating agent, the ignition device chamber being a space filled with a first-a gas generating agent and surrounded by a cylindrical first holder, a first igniter and a first cup member provided with a plurality of first communication holes penetrating a circumference wall thereof in a thickness direction, the cylindrical first holder being fixed to a first hole of the bottom plate of the closure shell, the first igniter being fixed inside the cylindrical first holder, and the first cup member being press-fitted to an inner side of the cylindrical first holder from an opening of the first cup member, the second combustion chamber being a space filled with the second gas generating agent and surrounded by a cylindrical second holder, a second igniter and a second cup member provided with a plurality of second communication holes penetrating a circumferential wall thereof in a thickness direction, the cylindrical second holder being fixed to a second hole of the bottom plate of the closure shell, the second igniter being fixed inside the cylindrical second holder, the second cup member being press-fitted to an outer side of the cylindrical second holder from an opening of the second cup member, and a surface of the circumferential wall including the plurality of the second communication holes being covered with a cover member from the outside, further, a support member for the cylindrical filter being disposed on a bottom surface of the closure shell, the support member including a bottom surface provided with holes corresponding to the first hole and the second hole formed in a bottom plate of the closure shell, and an outer circumferential wall provided vertically from an outer circumference of the bottom surface, part of the outer circumferential wall of the support member being held from both sides in a thickness direction between the first holder and the cylindrical filter, the bottom surface of the support member being held from both sides in a thickness direction between the bottom plate of the closure shell and an annular end surface of the opening of the second cup member press-fitted to the cylindrical second holder, the outer circumferential wall of the support member being abutted against an inner circumferential surface of the cylindrical filter on the side of the second annular end surface so that a corner portion formed by the bottom surface and the outer circumferential wall of the support member is abutted against an abutting portion between the second annular end surface of the cylindrical filter and the bottom plate of the closure shell, when the second igniter is actuated and the second gas generating agent in the second combustion chamber is ignited and burned to raise an internal pressure, a combustion gas flowing out between the second communication holes and the cover member in a direction of the bottom plate of the closure shell.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows an axial sectional view of a gas generator of the present invention;

FIG. 2 shows a partial view of FIG. 1;

FIG. 3 shows a perspective view of a support member for a cylindrical filter used in the gas generator shown in FIG. 1; and FIG. 4 shows a perspective view of a support member for a cylindrical filter of an embodiment different from that shown in FIG. 3.

DETAILED DESCRIPTION OF INVENTION

The present invention is to provide a gas generator in which a support member for a cylindrical filter is fixed by a combination of the housing and another member and the short-passing from an abutting portion between the housing bottom plate and the cylindrical filter is prevented by the support member for the cylindrical filter.

In the gas generator of the present invention, a combustion gas flows in a direction of the bottom plate of the housing at the time of actuation, and the short-passing, such that the combustion gas passes between the cylindrical filter and the bottom plate of the housing, is prevented by the support member for the cylindrical filter.

The support member includes the bottom surface, which has holes corresponding to the first hole and the second hole formed in the bottom plate of a closure shell, and the outer circumferential wall which is provided vertically from the outer circumference of the bottom surface.

Since the outer circumferential wall of the support member is abutted against the inner circumferential surface of the cylindrical filter on the side of the second annular end surface, the corner portion formed by the bottom surface and the outer circumferential wall of the support member is abutted against the abutting portion between the second annular end surface of the cylindrical filter and the bottom plate of the closure shell.

At the time of actuation of the gas generator, if a gap is generated at the abutting portion between the second annular end surface of the cylindrical filter and the bottom plate of the closure shell, the short-passing of the combustion gas may occur from the gap. However, in the gas generator of the present invention, the corner portion formed by the bottom surface and the outer circumferential wall of the support member is abutted against the gap to prevent the short-passing.

As the cylindrical filter, a coolant-filter or a coolant which is the same as that disclosed in JP-A No. H10-95304, JP-A No. 2001-206189, JP-A No. 2001-233167, and JP-A No. H11-334517 can be used.

The support member is press-fitted to the inner circumferential surface of the cylindrical filter and fixed by part of the outer circumferential wall of the support member held between the first holder and the cylindrical filter in a thickness direction, and the bottom surface of the support member held between the second cup member and the bottom plate of the housing in a thickness direction.

As described above, the support member is not merely press-fitted and fixed, but is fixed by being held in the thickness directions with a combination of other members. Thereby, a contact state between the corner portion, which is formed by the bottom surface and the outer circumferential wall of the support member, and the abutting portion, between the second annular end surface of the cylindrical filter and the bottom plate of the closure shell, is maintained.

Accordingly, the function of preventing the short-passing from the abutting portion between the second annular end surface of the cylindrical filter and the bottom plate of the closure shell is enhanced by the corner portion formed by the bottom surface and the outer circumferential wall of the support member.

In the gas generator of the present invention, it is preferable that a ratio ($h2/h1$) of a height ($h2$) of the outer circumferential wall of the support member to a height ($h1$) of the inner circumferential surface of the cylindrical filter is within a range of 0.1 to 0.2.

By setting within the above range, the short-passing prevention function is enhanced and passage of a combustion gas flow to the cylindrical filter is not hindered.

In the gas generator of the present invention, it is preferable that the diffuser shell includes an inner flat surface and an upper annular inclined surface inclined downward to an outer circumference of the diffuser shell, the closure shell includes an inner flat surface and a lower annular inclined surface inclined upward to an outer circumference of the closure shell, the first annular end surface of the cylindrical filter has an inclined surface capable of abutting against the upper annular inclined surface, and the second annular end surface of the cylindrical filter has an inclined surface capable of abutting against the lower annular inclined surface, and the first annular end surface of the cylindrical filter is abutted against the upper annular inclined surface of the diffuser shell, and the second annular end surface of the cylindrical filter is abutted against the lower annular inclined surface of the closure shell.

Thereby, positioning of the cylindrical filter is facilitated.

In the gas generator of the present invention, the short-passing of combustion gas from the contact surface between the closure shell and the cylindrical filter is prevented by the support member for the cylindrical filter disposed in the housing.

The gas generator of the present invention is used in an airbag apparatus installed in an automobile.

Embodiments of the Invention

The gas generator 1 shown in FIG. 1 has a housing 10 including a diffuser shell 11 and a closure shell 20. The diffuser shell 11 and the closure shell 20 are made of a metal such as iron or stainless steel.

The diffuser shell 11 has a top plate 12 and an upper circumferential wall 13, and has a flange 14 at an opening.

A plurality of gas discharge ports 15 are formed at equal intervals in the circumferential direction in the upper circumferential wall 13. The gas discharge ports 15 are closed with a seal tape 16 from the inside.

The closure shell 20 has a bottom plate 21 and a lower circumferential wall 22. A first hole 23 and a second hole 24 for mounting two igniters are formed in the bottom plate 21.

In the housing 10, the diffuser shell 11 is overlaid on the closure shell 20, and these shells are welded and integrated at a contact portion 25 between the inner surface of the upper circumferential wall 13 and the outer surface of the lower circumferential wall 22.

A cylindrical filter 30 is disposed in the housing 10.

The cylindrical filter 30 is disposed such that an outer circumferential surface 31a thereof is spaced apart from both the upper circumferential wall 13 with the gas discharge ports 15 and the lower circumferential wall 22.

A first annular end surface 32 of the cylindrical filter 30 is abutted against the top plate 12 of the diffuser shell 11, and a second annular end surface 33 on the opposite side is abutted against the bottom plate 21 of the closure shell 20.

In the embodiment shown in FIG. 1, the top plate 12 has an upper inclined surface 12a inclined downward to the outer circumference of the top plate 12, and the remaining surface thereof is flat. The bottom plate 21 has a lower inclined surface 21a inclined upward to the outer circumference of the bottom plate 21, and the remaining surface thereof is flat.

The first annular end surface 32 of the cylindrical filter 30 has an inclined surface corresponding to the upper inclined surface 12a, and the second annular end surface 33 has an inclined surface corresponding to the lower inclined surface 21a, and the filter 30 is positioned by the respective inclined surfaces abutting against the corresponding upper and lower inclined surfaces.

Further, the top plate 12 and the bottom plate 21 may be a flat surface without an inclined surface, and the flat first annular end surface 32 and the flat second annular end surface 33 of the cylindrical filter 30 may be used.

A first combustion chamber 40 and a second combustion chamber 50 are arranged inside the cylindrical filter 30.

The first combustion chamber 40 is a space on the outer side of an ignition device chamber 42 and the second combustion chamber 50.

The first combustion chamber 40 is filled with a required amount of the first-b gas generating agent 41b.

The ignition device chamber 42 is a space surrounded by a cylindrical first holder 43, a first igniter 44 and a first cup member 45.

A holder made of the same material as the closure shell 20 can be used as the first holder 43, and preferably, the first cup member 45 is made of iron, stainless steel, aluminum or the like.

The ignition device chamber 42 is filled with a required amount of the first-a gas generating agent 41a. A cushion material may be disposed as necessary at a bottom surface 47 of the first cup member 45.

The cylindrical first holder 43 is fitted into the first hole 23 of the bottom plate 21 of the closure shell and fixed by welding at the contact portion.

The first igniter 44 is fixed inside the cylindrical first holder 43.

In the embodiment shown in FIG. 1, as shown in FIG. 2, a metal collar 44a for the first igniter 44 is inserted to be positioned at an annular step surface 43a formed on the inner circumferential wall surface of the cylindrical first holder 43.

The first cup member 45 is press-fitted into the cylindrical first holder 43 from the opening 45a thereof, and the metal collar 44a is held between the annular end surface 46a of the opening 45a and the annular step surface 43a.

An O-ring 49 is fitted into an annular gap between the metal collar 44a and the inner circumferential wall surface of the first holder 43 in order to impart moisture resistance.

The outer diameter of the first cup member 45 on the side of the opening 45a is larger than the outer diameter on the side of the bottom surface 47, and the first cup member has a step portion 48 between the opening 45a and the bottom surface 47.

The first cup member 45 has a plurality of first communication holes 46b arranged in the circumferential direction in the circumferential wall 46 between the step portion 48 and the bottom surface 47. The plurality of the first communication holes 46b may be closed with a seal tape from the inside.

The plurality of the first communication holes 46b and a plurality of second communication holes 65 formed in the circumferential wall 64 of a second cup member 60 are arranged at different heights in the axis X direction.

Since a crimped portion 43b of the cylindrical first holder 43 on the side of the top plate 12 presses the step portion 48 of the first cup member 45 radially inward, the first cup member 45 is prevented from falling out in the axis X direction before the actuation.

The second combustion chamber 50 is a space surrounded by a cylindrical second holder 52, a second igniter 53 and the second cup member 60 which has the plurality of the second communication holes 65 penetrating the circumferential wall 64 in the thickness direction.

A holder made of the same material as the closure shell 20 can be used as the second holder 52, and preferably, the second cup member 60 is made of iron, stainless steel, aluminum or the like.

The second combustion chamber 50 is filled with a required amount of a second gas generating agent 51. A cushion material can be disposed as necessary at a bottom surface 62 of the second cup member 60.

The cylindrical second holder 52 is fitted into the second hole 24 of the bottom plate 21 of the closure shell and fixed by welding at the contact portion.

The second igniter 53 is fixed inside the cylindrical second holder 52.

In the embodiment shown in FIG. 1, as shown in FIG. 2, a metal collar 53a for the second igniter 53 is inserted to be positioned at an annular step surface 52a formed on the inner circumferential wall surface of the cylindrical second holder 52, and the metal collar 53a is pressed and fixed by a crimped portion 52b of the cylindrical second holder 52.

An O-ring 59 is fitted into an annular gap between the metal collar 53a and the inner circumferential wall surface of the second holder 52 in order to impart moisture resistance.

The second cup member 60 is press-fitted onto the outer side of the cylindrical second holder 52 from an opening 61 thereof.

The outer diameter of the second cup member 60 on the side of the opening 61 is smaller than the outer diameter on the side of the bottom surface 62, and the second cup member has a step portion 63 between the opening 61 and the bottom surface 62.

The second cup member 60 has the plurality of the second communication holes 65 arranged in the circumferential direction in the circumferential wall 64 between the step portion 63 and the bottom surface 62.

In the second cup member 60, a surface including the bottom surface 62 and the plurality of the second communication holes 65 of the circumferential wall 64 is covered with a cup-shaped cover member 67 from the outside.

The cover member 67 may have a cylindrical shape, provided that it covers at least a surface of the circumferential wall 64 including the plurality of the second communication holes 65.

The cover member 67 is made of a metal, preferably of a cold-rolled steel plate (SPCC).

A notch (for example, a portion cut out into a triangle) may be formed on the side of the opening of the cover member 67, and when the cover member receives a pressure of a combustion gas ejected from the second communication holes 65 in the second cup member 60, the cover member is split from the cutout portion so that the combustion gas easily flows out to the bottom plate 21.

A support member 70 of the cylindrical filter 30 is disposed on the bottom plate 21 of the closure shell 20.

As shown in FIG. 3, the support member 70 includes a bottom surface 71 and an outer circumferential wall 74 provided vertically from an outer circumference of the bottom surface 71.

The bottom surface 71 has a hole 72 and a hole 73 having the same shape and size as the first hole 23 and the second hole 24 famed in the bottom plate 21 of the closure shell 20 respectively.

When the hole 72 and the hole 73 in the support member 70 are disposed as shown in FIG. 1, the positions thereof are adjusted so that the hole 72 and the first hole 23 are aligned with each other, and the hole 73 and the second hole 24 are aligned with each other.

The outer circumferential surface 74a of the outer circumferential wall 74 of the support member 70 is abutted against the inner circumferential surface 31b of the cylindrical filter 30 on the side of the second annular end surface 33, and part of the outer circumferential wall 74 is held from both sides in the thickness direction by the first holder 43 and the inner circumferential surface 31b of the cylindrical filter 30.

The bottom surface 71 of the support member 70 is held from both sides in the thickness direction between the bottom plate 21 of the closure shell 20 and the annular end surface 61a of the opening 61 of the second cup member 60.

In the support member 70, a corner portion 75 famed by the bottom surface 71 and the outer circumferential wall 74 is abutted against the abutting portion between the second annular end surface 33 of the cylindrical filter 30 and the lower inclined surface 21a of the bottom plate 21 of the closure shell 20.

The ratio (h2/h1) of the height (h2) of the outer circumferential wall 74 of the support member 70 to the height (h1) of the inner circumferential surface of the cylindrical filter 30, that is, in the illustrated example, the height from the housing bottom plate 21 to the top plate 12 is preferably in the range of 0.1 to 0.2, and more preferably in the range of 0.1 to 0.15.

When h2/h1 is within the above range, a function of preventing the short-passing from the abutting portion between the second annular end surface 33 and the lower inclined surface 21a is sufficiently enhanced, and a function of filtering and cooling the combustion gas passing through the cylindrical filter 30 and then discharging the combustion gas from the gas discharge port 15 is also maintained.

As shown in FIG. 4, the support member 70 may have a single hole 80 in the bottom surface 71.

The single hole 80 has a shape and size capable of including the first hole 23 and the second hole 24 formed in the bottom plate 21 of the closure shell 20.

An inner circumferential portion 81 of the hole 80 is formed to abut against part of the outer circumferential surface of the first holder 43 and part of the outer circumferential surface of the second holder 52.

If necessary, a retainer for supporting the first-b gas generating agent 41b can be disposed in the gas generator 1.

Next, an operation, when the gas generator 1 of the present invention is used in an airbag apparatus of an automobile, will be described.

The operation in which the first igniter 44 is initially actuated and the second igniter 53 is actuated with a slight delay will be described in the following.

Where the first igniter 44 is actuated to ignite and burn the first-a gas generating agent 41a in the ignition device chamber 42, the combustion gas flows out from the first communication holes 46b of the first cup member 45 into the first combustion chamber 40 and ignites and burns the first-b gas generating agent 41b.

When the pressure inside the first combustion chamber 40 further rises due to the combustion of the first-b gas generating agent 41b, the top plate 12 deforms in the axis X direction. At this time, the upper inclined surface 12a of the outer circumference of the top plate 12 is unlikely to deform, whereas the remaining flat surface is easily deformed.

Further, even when the first-a gas generating agent 41a in the ignition device chamber 42 and the first-b gas generating agent in the first combustion chamber 40 are burnt to generate a combustion gas, since the second communication holes 65 of the second cup member 60 are covered with the metallic cover member 67, the second gas generating agent 51 in the second combustion chamber 50 is not ignited by the combustion gas.

The combustion gas in the first combustion chamber 40 passes through the cylindrical filter 30, breaks the seal tape 16 and is discharged from the gas discharge ports 15 into the air bag.

The second igniter 53 is then actuated, and the second gas generating agent 51 in the second combustion chamber 50 is ignited and burned to generate a combustion gas.

Since the second communication holes 65 of the second combustion chamber 50 are covered with the cover member 67, the combustion gas flows from the gap between the second communication holes 65 and the cover member 67 toward the bottom plate 21.

In the support member 70, the corner portion 75 formed by the bottom surface 71 and the outer circumferential wall 74 is abutted against the abutting portion between the second annular end surface 33 of the cylindrical filter 30 and the lower inclined surface 21a of the bottom plate 21 of the closure shell 20.

Therefore, even when a gap is generated between the second annular end surface 33 of the cylindrical filter 30 and the lower inclined surface 21a of the bottom plate 21 of the closure shell 20, the short-passing of the combustion gas is prevented by the corner portion 75 formed by the bottom surface 71 and the outer circumferential wall 74.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising a housing foamed by a diffuser shell provided with a gas discharge port, and a closure shell, a cylindrical filter disposed inside the housing, a first combustion chamber and a second combustion chamber arranged inside the cylindrical filter, the cylindrical filter being disposed such that an outer circumferential surface is spaced apart from the gas discharge port, a first annular end surface is abutted against a top plate of the diffuser shell, and a second annular end surface is abutted against a bottom plate of the closure shell, the first combustion chamber being a space on the outer side of an ignition device chamber provided with an ignition device for a first-b gas generating agent filled inside the first combustion chamber, and the second combustion chamber being filled with a second gas generating agent, the ignition device chamber being a space filled with a first-a gas generating agent and surrounded by a cylindrical first holder, a first igniter and a first cup member provided with a plurality of first communication holes penetrating a circumference wall thereof in a thickness direction, the cylindrical first holder being fixed to a first hole of the bottom plate of the closure shell, the first igniter being fixed inside the cylindrical first holder, and the first cup member being press-fitted to an inner side of the cylindrical first holder from an opening of the first cup member, the second combustion chamber being a space filled with the second gas generating agent and surrounded by a cylindrical second holder, a second igniter and a second cup member provided with a plurality of second communication holes penetrating a circumferential wall thereof in a thickness direction, the cylindrical second holder being fixed to a second hole of the bottom plate of the closure shell, the second igniter being fixed inside the cylindrical second holder, the second cup member being press-fitted to an outer side of the cylindrical second holder from an opening of the second cup member, and a surface of the circumferential wall including the plurality of the second communication holes being covered with a cover member from the outside, further, a support member for the cylindrical filter being disposed on a bottom surface of the closure shell, the support member including a bottom surface provided with holes corresponding to the first hole and the second hole formed in a bottom plate of the closure shell, and an outer circumferential wall provided vertically from an outer circumference of the bottom surface, part of the outer circumferential wall of the support member being held from both sides in a thickness direction between the first holder and the cylindrical filter, the bottom surface of the support member being held from both sides in a thickness direction between the bottom plate of the closure shell and an annular end surface of the opening of the second cup member press-fitted to the cylindrical second holder, the outer circumferential wall of the support member being abutted against an inner circumferential surface of the cylindrical filter on the side of the second annular end surface so that a corner portion formed by the bottom surface and the outer circumferential wall of the support member is abutted against an abutting portion between the second annular end surface of the cylindrical filter and the bottom plate of the closure shell, when the second igniter is actuated and the second gas generating agent in the second combustion chamber is ignited and burned to raise an internal pressure, a combustion gas flowing out between the second communication holes and the cover member in a direction of the bottom plate of the closure shell.

2. The gas generator according to claim 1, wherein a ratio (h2/h1) of a height (h2) of the outer circumferential wall of the support member to a height (h1) of the inner circumferential surface of the cylindrical filter is within a range of 0.1 to 0.2.

3. The gas generator according to claim 1, wherein
the diffuser shell includes an inner flat surface and an upper annular inclined surface inclined downward to the outer circumference of the diffuser shell,
the closure shell includes an inner flat surface and a lower annular inclined surface inclined upward to the outer circumference of the closure shell,
the first annular end surface of the cylindrical filter has an inclined surface capable of abutting against the upper annular inclined surface, and the second annular end surface of the cylindrical filter has an inclined surface capable of abutting against the lower annular inclined surface, and
the first annular end surface of the cylindrical filter is abutted against the upper annular inclined surface of the diffuser shell, and the second annular end surface of the cylindrical filter is abutted against the lower annular inclined surface of the closure shell.

* * * * *